US00RE33971E

United States Patent [19]

Wolfe

[11] E Patent Number: Re. 33,971

[45] Reissued Date of Patent: Jun. 23, 1992

[54] CASKET LINER

[76] Inventor: Martin D. Wolfe, 1650 Haines Rd., Lapeer, Mich. 48446

[21] Appl. No.: 711,158

[22] Filed: Jun. 6, 1991

Related U.S. Patent Documents

Reissue of:

[64] Patent No.: 4,951,367
Issued: Aug. 28, 1990
Appl. No.: 364,895
Filed: Jun. 12, 1989

[51] Int. Cl.[5] ..... A63G 17/04
[52] U.S. Cl. ..... 27/19; 27/2
[58] Field of Search ..... 27/2–11, 27/19, 23, 35

[56] References Cited

U.S. PATENT DOCUMENTS 3,488,818 1/1970 Orr ..... 27/2
4,448,826 5/1984 Davidian ..... 27/3 X
4,780,940 11/1988 Jay ..... 27/2 X
4,827,581 5/1989 Davidian ..... 27/3

FOREIGN PATENT DOCUMENTS 2719154 11/1988 Fed. Rep. of Germany ..... 27/19
2538898 7/1984 France ..... 27/19
2590796 6/1987 France ..... 27/19
2206334 1/1989 United Kingdom ..... 27/19

*Primary Examiner*—Richard E. Chilcot, Jr.
*Attorney, Agent, or Firm*—Reising, Ethington, Barnard, Perry & Milton

[57] ABSTRACT

A casket construction includes a metal container for a body having a bottom and side walls of metal material which is susceptible to corrosion. A non-corrosive liner pan is located in the bottom of the container to shield the bottom and the side walls from corrosion. The liner pan is a unitary member including a base and integral side walls which interlock with the side walls of the metal container to hold the liner pan in place so as to locate the base in close juxtaposed relationship with the bottom of the metal container.

16 Claims, 1 Drawing Sheet

FIG 1
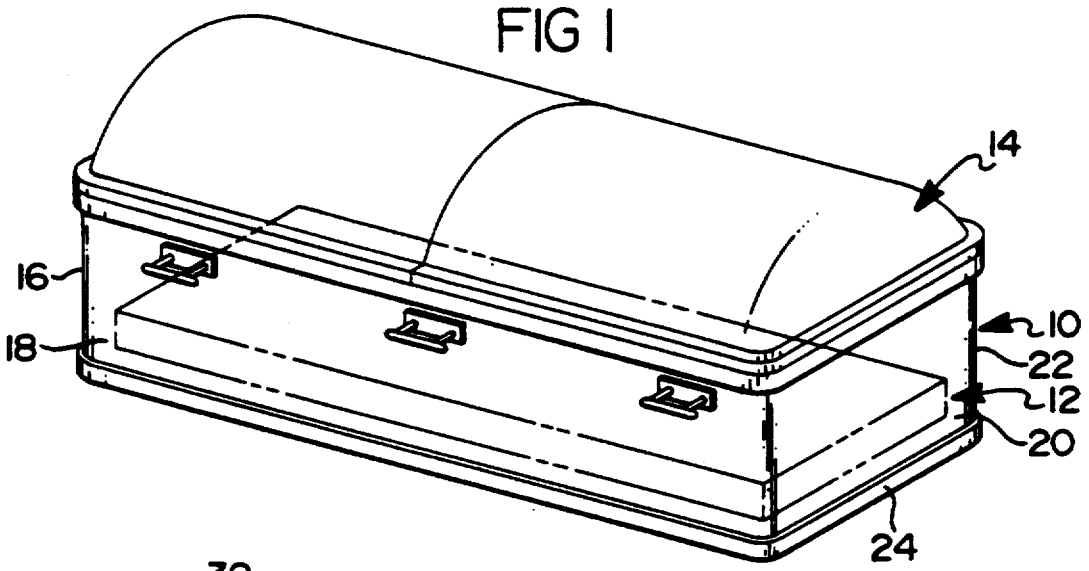
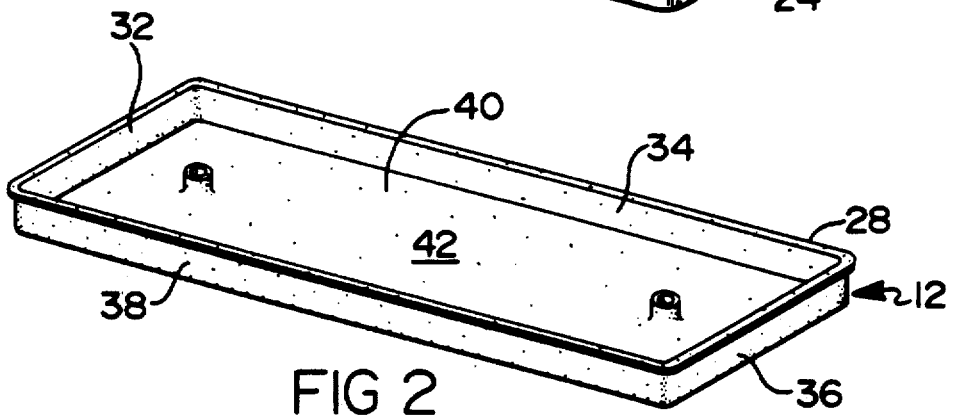
FIG 2
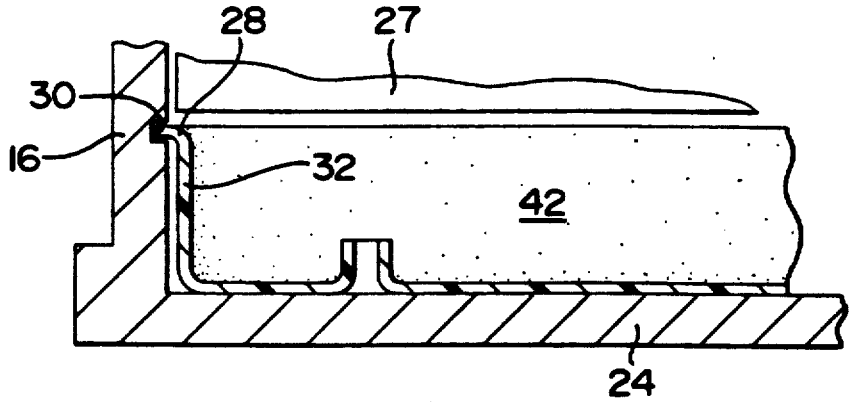
FIG 3

CASKET LINER

Matter enclosed in heavy brackets [ ] appears in the original patent but forms no part of this reissue specification; matter printed in italics indicates the additions made by reissue.

FIELD OF THE INVENTION

This invention relates to casket constructions and more particularly to metal casket constructions having a metal container for a body defined by a bottom and side walls which require protection against corrosion.

BACKGROUND OF THE INVENTION

It is known to provide anodic corrosion protection of metal casket constructions wherein a metal container encloses the body. In such cases the embalming fluid and body deterioration can produce a fluid which is highly acidic and therefor able to corrode away metals that are used in metal containers which are used in many present day coffin constructions. In order to retard such corrosion, anodes are connected to the metal container of the coffin. The anodic material is selected to be more susceptible to corrosion than the base metal material of the coffin construction, e.g., in the case of steel container the anodes can be made of magnesium. The anodes are connected to the steel container and are preferentially corroded to protect the integrity of the low cost material of the metal container.

It is also known to make the whole casket construction from plastic material to form a body enclosure. Examples of such constructions are set forth in U.S. Pat. Nos. 4,800,631; 3,997,948; 3,545,055; and 2,916,797.

SUMMARY OF THE INVENTION

An object of the present invention is to provide a casket construction in which a metal container is formed by use of existing tooling and experienced labor to form a low cost construction the container having a bottom and side walls formed of metallic material susceptible to corrosion characterized by the further provision of a liner in the form of a shield member insertable within the metal container for shielding its bottom and side walls against corrosion.

A further feature of the present invention is to adapt known metal casket constructions to be more corrosion resistant by use of a shield member having a base and side walls partially shielding the side walls of the metal container to collect any products of bodily decomposition before contact thereof with the base metal of the container.

Another feature of the present invention is to solve the problem of corrosion in known metal casket construction by locating a shield member therein having a shallow pan shape with a base located in juxtaposed relationship with the bottom of said metal container and with side walls located in interlocking engagement with the side walls of said metal container.

Another feature of the present invention is to provide such a casket construction further characterized by said shield member being a plastic which is resistant to acidic solutions.

Yet another feature of the present invention is to provide such a casket construction in which the insertable shield is in the form of a single integral member of sheet plastic material which is resistant to acidic solutions.

Further objects, features and advantages of the invention will become more apparent from the following detailed description of the invention taken in conjunction with the accompanying drawing in which:

BRIEF DESCRIPTION OF THE DRAWINGS

FIG. 1 is a perspective view of the invention in a standard casket construction formed as metal container for a body;

FIG. 2 is a perspective view of a shield pan of the present invention; and

FIG. 3 is a fragmentary sectional view of the shield pan of FIG. 2 inserted in interlocking relationship with the bottom of the casket construction.

DETAILED DESCRIPTION

Referring now to the drawing, a metal casket construction 10 is illustrated of the type having a metal container 12 for a body and a lid 14 for covering the metal container 12.

The metal container specifically includes metal side walls 16–22 formed by standard metal bending and welding techniques or by casting techniques. The side walls 16–22 are connected to a bottom or base member 24 of like metal construction.

In order to solve the problem of collection of fluids which are created over time by bodily decomposition the present invention includes a shield member 26 located in the bottom of the casket construction 10 at a point below cushioning or other body support means 27 as partially shown in FIG. 3 which will support the interred body within the metal container 12.

Specifically, the shield member 26 is formed from a single sheet of corrosion resistant plastic. The single sheet of plastic includes a continuously molded upper lip 28 which is located in pressure sealed relationship with the inside surfaces 16a–20a of the side walls 16–18 at a recess 30 therein located above the bottom 24 of the metal container 12. Additionally the sheet of plastic has side walls 32–38 which extend upwardly from a base 40. Side walls 32–38 and base 40 combine to form a shallow pan insert which has an open cavity 42 located below a supported body. The cavity will collect any corrosive body fluids so as to prevent them from directly contacting the metal walls and base of the metal container 12.

In the illustrated embodiment the shield member is preferably made from castable, injection moldable or thermoformable plastic materials such as polyester resins or acrylic compounds, or ionic polymers, or nitrile resins or polycarbonates or polyethylene and other polymer compounds. The requirement of the invention is that the material be easily inserted into the bottom regions of known metal constructions and once in place provide a corrosion resistant collection point for any products of bodily decomposition.

In order to meet this objective in one proposed embodiment the side walls 32–38 are elevated between 6 to 8 inches above the bottom. The lip 28 is configured to have a length which establishes a pressure seal at the recess 30 to hold the shield member in its inserted position so that other components including body platform and cushions can be later assembled in place. To this end, the bottom 42 of the pan includes integrally formed hollow risers 44 which fit over brackets 46 on the casket bottom 24. The brackets 46 are spot welded to the casket bottom 24 and are provided for spring and mattress mounting. While two risers are illustrated it should be recognized that more risers or less can be provided depending upon the design of a metal container in which the liner of the present invention is to be inserted.

Also if desired, depending upon the wall thickness of the molded plastic liner 26, it might be desirable to add reinforcing ribs such as ribs 48 as partially shown in FIG. 3.

The shield member 26 of the present invention enables a casket manufacturer to continue to use existing metal forming and welding tooling for the basic casket construction and incorporate only minimal changes therein for receipt of the insertable shield member 26. The resultant combination affords corrosion resistance heretofore achieved only by use of expensive anodic protection systems or by use of all plastic constructions, which constructions of necessity would require extensive retooling of many existing casket manufacturing facilities.

Thus, there has been provided a casket construction which fully satisfies the objects, aims and advantages set forth above. While the television has been described in connection with a specific embodiment thereof, it is evident that many alternatives, modifications and variations will be apparent to those skilled in the art in light of the foregoing description. Accordingly, it intended to embrace all such alternatives, modifications, and variations as fall within the spirit and broad scope of the appended claims.

What is claimed is:

1. In a casket construction including a metal container having a bottom and side walls joined to surround a body support structure for supporting a body within the metal container above the bottom thereof, the metal container bottom and side walls formed of metallic material susceptible to corrosion the improvement comprising:

a shallow pan insert of non-corrosive material inserted in said metal container at a point below the body support structure; said shallow pan insert having side walls located below the body support structure within the metal container supported body and having a vertical height to shield the metal container from fluid drainage from the body;

said side walls forming a cavity for collecting fluid drainage from the body at a point below the body and for isolating the collected fluid from contact with the bottom and side walls of the metal container.

2. The casket construction of claim 1, further characterized by said shallow pan insert having a base fully covering the bottom of said metal container and side wall flanges only partially shielding the side walls of said metal container.

3. The casket construction of claim 1, further characterized by said shallow pan insert having a base located in juxtaposed relationship with the bottom of said metal container and having side walls with an upper lip thereon; means forming a lock opening in the side walls of said metal container below the body support structure; said upper lip located in interlocking engagement with said lock opening in the side walls of said metal container.

4. The casket construction of claim 1, further characterized by said shallow pan insert formed of a plastic material which is resistant to acidic solutions.

5. The casket construction of claim 1, characterized by said shallow pan insert being formed as a single integral member from a sheet of plastic material which is resistant to acidic solutions.

6. In the casket construction of claim 4 said plastic material being [catable]*castable*, injection moldable of thermoformable polyester resins or acrylic compounds, or ionic polymers, or nitrile resins or polycarbonates or polyethylene and other polymer compounds.

7. In the casket construction of claim 5, said plastic material being castable, [injkection] *injection* moldable or thermoformable polyester resins or acrylic compounds, or ionic polymers, or nitrile resins or polycarbonates or polyethylene and other polymer compounds.

8. The casket construction of claim 2, characterized by said shield member being formed as a single integral member from a sheet of plastic material which is resistant to acidic solutions.

*9. In a casket construction including a container having a bottom and side walls joined to surround a body support structure for supporting a body within the container above the bottom thereof, the improvement comprising:*

*a shallow pan insert of non-corrosive material inserted in said container at a point below the body support structure; said shallow pan insert having side walls including a vertical height to shield the container from fluid drainage from the body;*

*said side walls forming a cavity for collecting fluid drainage from the body at a point below the body and for isolating the collected fluid from contact within the bottom and side walls of the container.*

*10. The casket construction of claim 9, further characterized by said shallow pain insert having a base fully covering the bottom of said container and side walls flanges only partially shielding the side walls of said container.*

*11. The casket construction of claim 9, further characterized by said shallow pan insert having a base located in juxtaposed relationship with the bottom of said container and having side walls with an upper lip thereon; means forming a lock opening in the side walls of said container below the body support structure; said upper lip located in interlocking engagement with said lock opening in the side walls of said container.*

*12. The casket construction of claim 9, further characterized by said shallow pan insert formed of a plastic material which is resistant to acidic solutions.*

*13. The casket construction of claim 9, characterized by said shallow pan insert being formed as a single integral member from a sheet of plastic material which is resistant to acidic solutions.*

*14. In the casket construction of claim 12 said plastic material being castable injection moldable or thermoformable polyester resins or acrylic compounds, or ionic polymers, or nitrile resins or polycarbonates or polyethylene and other polymer compounds.*

*15. In the casket construction of claim 13, said plastic material being castable, injection moldable or thermoformable polyester resins or acrylic compounds, or ionic polymers, or nitrile resils or polycarbonates or polyethylene and other polymer compounds.*

*16. The casket construction of claim 10, characterized by said shallow pan insert being formed as a single integral member from a sheet of plastic material which is resistant to acidic solutions.*

* * * * *